(12) United States Patent
Ito et al.

(10) Patent No.: US 8,123,272 B2
(45) Date of Patent: Feb. 28, 2012

(54) VEHICLE SEAT (75) Inventors: Makoto Ito, Aichi (JP); Yoshihiro Ooishi, Kariya (JP); Tomohiro Muramatsu, Nagoya (JP); Osamu Fujimoto, Nisshin (JP); Robert Day, Toyota (JP)

(73) Assignees: Toyota Boshoku Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 261 days.

(21) Appl. No.: 12/439,347

(22) PCT Filed: Sep. 5, 2007

(86) PCT No.: PCT/JP2007/067769
§ 371 (c)(1),
(2), (4) Date: May 6, 2009

(87) PCT Pub. No.: WO2008/029952
PCT Pub. Date: Mar. 13, 2008

(65) Prior Publication Data
US 2010/0007167 A1 Jan. 14, 2010

(30) Foreign Application Priority Data
Sep. 6, 2006 (JP) .................. 2006-241429
Sep. 27, 2006 (JP) .................. 2006-262470

(51) Int. Cl.
*B60N 2/30* (2006.01)
*B60N 2/10* (2006.01)
(52) U.S. Cl. .................. 296/65.09; 296/65.03; 297/15; 297/335; 297/378.12
(58) Field of Classification Search .............. 296/65.03, 296/65.09; 297/15, 378.12, 316, 326, 334, 297/335
See application file for complete search history.

(56) References Cited

U.S. PATENT DOCUMENTS 6,983,993 B2   1/2006 Hahn
7,213,861 B2 * 5/2007 Yokoyama et al. ........ 296/65.09
(Continued)

FOREIGN PATENT DOCUMENTS

DE    102004014605    10/2005
(Continued)

OTHER PUBLICATIONS

Japan Office action, dated Dec. 21, 2010 (JP Appl. No. 2006-241429) along with an english translation thereof.

(Continued)

*Primary Examiner* — Dennis Pedder
(74) *Attorney, Agent, or Firm* — Greenblum & Bernstein, P.L.C.

(57) ABSTRACT

A vehicle seat is taught that preferably include a seat cushion (10), a seat back (20) rotatably connected to the seat cushion via a reclining mechanism (30), front (40) and rear (46) legs removably connecting the seat cushion to a vehicle floor (66), a retracting link (50), an operating member capable of removing the front and rear legs from the floor, and a coupling link (54). The seat back can be rotated forwardly by unlocking the reclining mechanism, so as to be superimposed on the seat cushion. When the front and rear legs are removed from the floor, the seat can be moved from a use condition to a retracted condition depending on the motion of the retracting link. When the seat is moved from the use condition to the retracted condition, the coupling link rotates the front leg based on a displacement of the retracting link, thereby unlocking the reclining mechanism.

2 Claims, 10 Drawing Sheets

U.S. PATENT DOCUMENTS

| | | |
|---|---|---|
| 2005/0184549 A1 | 8/2005 | Robinson et al. |
| 2008/0315654 A1 | 12/2008 | Boudinot et al. |

FOREIGN PATENT DOCUMENTS

| | | |
|---|---|---|
| DE | 102005043254 | 3/2007 |
| DE | 102006020370 | 11/2007 |
| EP | 1468867 | 10/2004 |
| EP | 1705056 | 9/2006 |
| EP | 1747936 | 1/2007 |
| EP | 1747936 A | 1/2007 |
| JP | 6-144092 | 5/1994 |
| JP | 2001-347864 | 12/2001 |
| JP | 2002-019505 | 1/2002 |
| JP | 2002-029299 | 1/2002 |
| JP | 2002-101997 A | 4/2002 |
| JP | 2002-307991 A | 10/2002 |
| JP | 2003-054297 A | 2/2003 |
| JP | 2005-126035 | 5/2005 |
| JP | 2005-145288 A | 6/2005 |
| JP | 2005-231479 | 9/2005 |
| JP | 2005-247104 A | 9/2005 |
| JP | 2006-008012 | 1/2006 |
| JP | 2006-082754 A | 3/2006 |
| WO | 2005/076963 A | 8/2005 |
| WO | 2007/028506 A | 3/2007 |

OTHER PUBLICATIONS

Japan Office action, dated Dec. 21, 2010 (JP Appl. No. 2006-262470) along with an english translation thereof.
English language Abstract of JP 2003-054297 A.
English language Abstract of JP 2002-101997 A.
English language Abstract of JP 2005-145288 A.
English language Abstract of JP 2006-082754 A.
English language Abstract of JP 2002-307991 A.

* cited by examiner

VEHICLE SEAT

TECHNICAL FIELD

The present invention relates to a vehicle seat.

BACKGROUND ART

A conventional vehicle seat is shown in, for example, Japanese Laid-Open Patent Publication No. 2005-247104. In the seat, a seat cushion is attached to a floor via front and rear legs, so that the seat can be retained in a use condition. An upper end portion of each of the front and rear legs is rotatably connected to a cushion frame. Conversely, a lower end portion of each of the front and rear legs is removably connected to the floor. Further, each of the rear legs has a retracting link that is extended therefrom. A distal end of the retracting link is rotatably connected to a recessed portion formed in the floor via a pivot member.

In order to move the seat from the use condition to a retracted condition, first, a lever (or a strap) provided on a rear surface of a seat back is pulled, so that a reclining mechanism is unlocked. Thereafter, the seat back is rotated forwardly so as to be superimposed on the seat cushion, thereby changing the seat to a folded condition. Next, the lever is further pulled, so that connecting devices between the front and rear legs and the floor side are respectively unlocked. Thereafter, the folded seat is pivoted rearwardly by pivoting the retracting link about the pivot member, so as to be received in the recessed portion of the floor. Thus, the seat can be changed from the use condition to the retracted condition.

However, in order to retract the seat thus constructed, it is necessary to perform at least three operations, i.e., (1) rotating the seat back and superimposing the same on the seat cushion, thereby changing the seat to the folded condition, (2) pivoting the folded seat rearwardly by pivoting the retracting link, and (3) receiving the folded seat in the recessed portion of the floor. In addition, a large force is required in order to pull the lever so as to unlock the reclining mechanism.

Another vehicle seat is shown in Japanese Laid-Open Patent Publication No. 2003-54297. The seat includes a rotational mechanism that can move the seat between a use condition and a retracted condition. The rotational mechanism may include a support shaft, and first and second spiral springs attached to the support shaft. The first spiral spring is arranged and constructed such that a biasing force is generated when the seat is moved from the use condition to the retracted condition. To the contrary, the second spiral spring is arranged and constructed such that a biasing force is generated when the seat is moved from the retracted condition to the use condition. According to the seat thus constructed, when the seat is moved from the use condition to the retracted condition, the rotational motion can be assisted by the biasing force of the second spiral spring. To the contrary, when the seat is moved from the retracted condition to the use condition, the rotational motion can be assisted by the biasing force of the first spiral spring.

However, the rotational mechanism of the seat includes two spiral springs. This may lead to increased manufacturing cost and increased weight.

DISCLOSURE OF INVENTION

Thus, there is a need in the art for an improved vehicle seat.

In one embodiment of the present invention, a vehicle seat may include a seat cushion, a seat back rotatably connected to the seat cushion via a reclining mechanism, front and rear legs removably connecting the seat cushion to a vehicle floor, a retracting link, an operating member capable of removing the front and rear legs from the floor, and a coupling link. The seat back can be rotated forwardly by unlocking the reclining mechanism, so as to be superimposed on the seat cushion. When the front and rear legs are removed from the floor, the seat can be moved from a use condition to a retracted condition depending on the motion of the retracting link. When the seat is moved from the use condition to the retracted condition, the coupling link rotates the front leg based on a displacement of the retracting link, thereby unlocking the reclining mechanism According to this embodiment, the seat can be switched from the use condition to the retracted condition while the seat back is rotated forwardly (i.e., while the seat is folded). Therefore, the seat can be directly retracted in the floor by utilizing an operational force for rotating the seat back and the gravitational force. That is, the seat can be switched from the use condition to the retracted condition in one operation. In addition, the reclining mechanism can be automatically released or unlocked without operating the operating member. Therefore, a force required to operate the operating member can be reduced.

In another embodiment, upper end portions of the front and rear legs are respectively rotatably connected to a cushion frame of the seat cushion. The retracting link is composed of the rear leg and an elongated member extending from a lower end thereof. The elongated member is rotatably connected to the floor. The coupling link movably connects the front and rear legs and is movably connected to the floor via an auxiliary link at a central portion thereof.

According to this embodiment, the seat cushion is supported on the floor by a parallel linkage that is composed of the retracting link and the auxiliary link. Therefore, the seat can be reliably moved along a highly stabilized trajectory when the seat is moved from the use condition to the retracted condition. As a result, the operational force can be effectively used, so that the seat can be smoothly retracted.

In a further embodiment, a vehicle seat that can be switched between a use condition and a nonuse condition may include a first and second members that can rotate relative to each other when the seat is switched between the use condition and the retracted condition, and a torsion spring. The torsion spring is arranged and constructed to generate biasing forces in the rotational directions of the first and second members, so that the biasing forces can assist the relative rotation of the first and second members when the seat is in the use condition and the nonuse condition. The torsion spring is arranged and constructed such that the directions of the biasing forces thereof can be changed during the relative rotation of the first and second members.

According to this embodiment, when the seat is moved between the use condition and the retracted condition, the directions of the biasing forces of the torsion spring can be changed during the relative rotation of the first and second members. Therefore, the torsion spring can generate different biasing forces directed to different directions depending on rotational angles of the first and second members. That is, the torsion spring may generate an assisting force and a resisting force when the seat is moved between the use condition and the retracted condition.

Other objects, features, and advantages, of the present invention will be readily understood after reading the following detailed description together with the accompanying drawings and the claims.

BEST MODE FOR CARRYING OUT THE INVENTION

Detailed representative embodiments of the present invention will now be described with reference to the drawings.

First Detailed Representative Embodiment

First, a first embodiment of the present invention will be described with reference to FIGS. 1 to 8.

Figure 1:
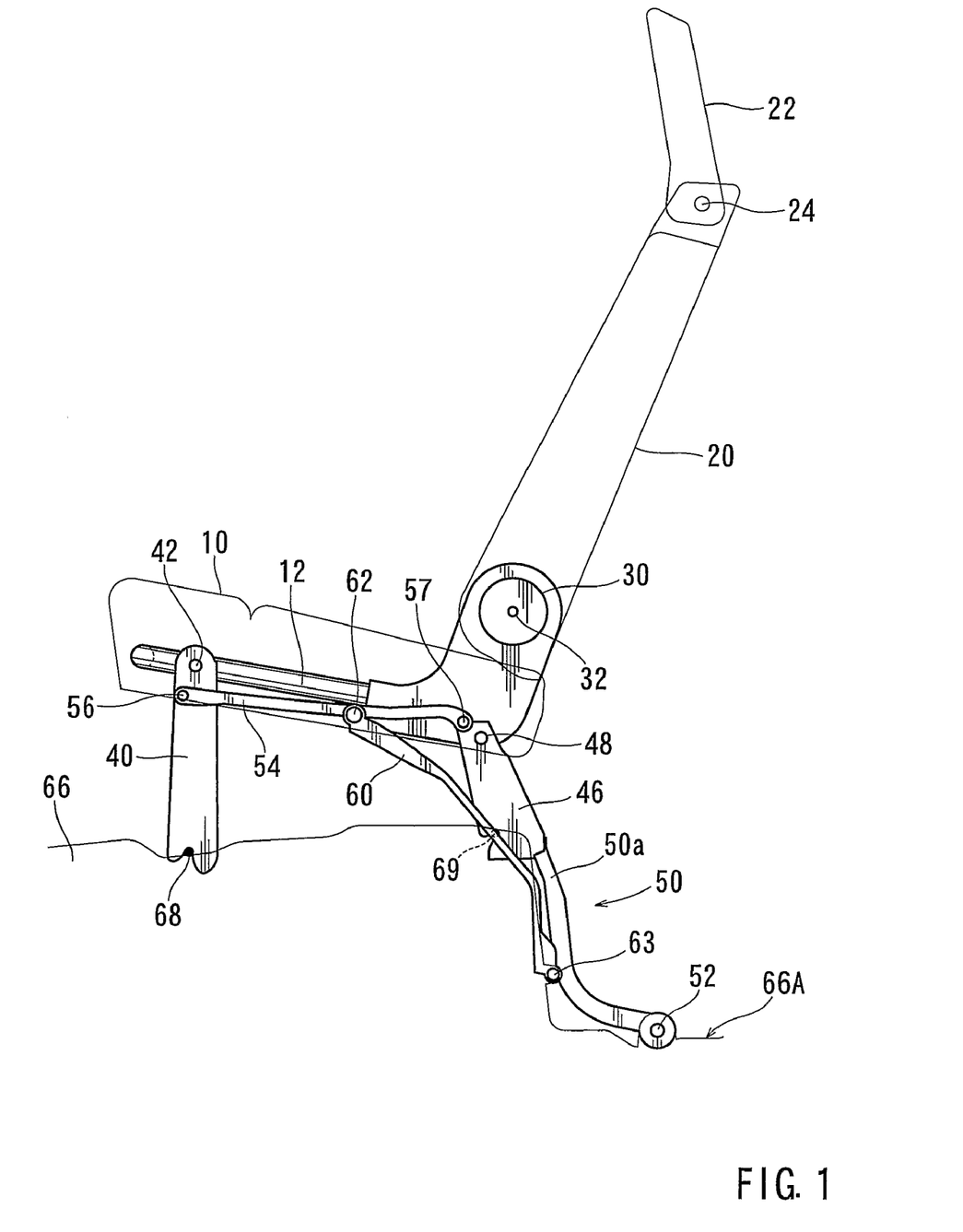
FIG. 1 is a side view of a vehicle seat according to a first embodiment of the present invention, which illustrates a use condition.
Figure 2:
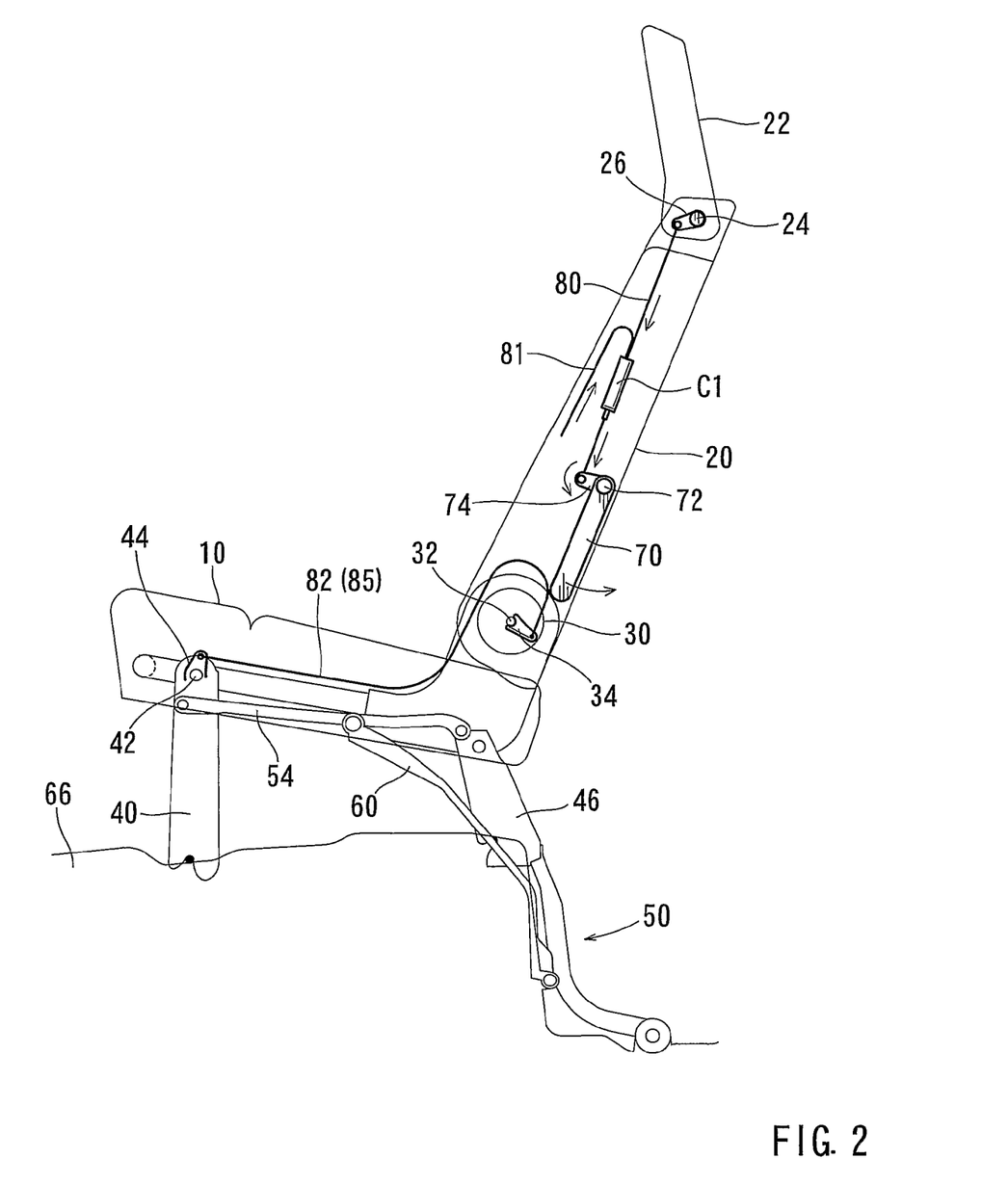
FIG. 2 is a side view of the vehicle seat, which illustrates an unlocking mechanism thereof.

A vehicle seat (a retractable seat) shown in FIGS. 1 and 2 may include a seat cushion 10, a seat back 20 and a headrest 22. The seat cushion 10 is attached to a floor 66 via a pair of front legs 40 (one of which is shown for illustration purposes) and a pair of rear legs 46 (one of which is shown for illustration purposes). Further, the front legs 40 and associated members thereof may have the same structure. Therefore, a structure of one of the front legs 40 will be described hereinafter. Similarly, the rear legs 46 and associated members thereof may have the same structure. Therefore, a structure of one of the rear legs 46 will be described hereinafter.

The seat back 20 is rotatably connected to the seat cushion 10 via a pair of seat reclining mechanisms 30 (one of which is shown). Therefore, the seat back 20 can be tilted back and forth by operating the seat reclining mechanism 30 about a rotational shaft 32 thereof, so that a reclining angle thereof can be controlled. In addition, the seat back 20 can be rotated forwardly by unlocking the reclining mechanism 30, so as to be superimposed on the seat cushion 10. Further, the headrest 22 is rotatably connected to the seat back 20 via a connecting shaft 24, so as to be inclined with respect to the seat back 20.

In particular, the reclining mechanism 30 is connected to a cushion frame 12 of the seat cushion 10 and a back frame (not shown) of the seat back 20. Further, upper end portions of the front and rear legs 40 and 46 are respectively rotatably connected to the cushion frame 12 via support shaft 42 and 48. Conversely, lower end portions of the front and rear legs 40 and 46 are respectively removably connected or locked to anchors 68 and 69 disposed on the floor 66 via connecting or locking devices (not shown).

The rear leg 46 has an elongated member 50a that is fixedly connected to a lower end thereof. The rear leg 46 and the elongated member 50a may constitute a retracting link 50. A distal end of the elongated member 50a, i.e., a lower end of the retracting link 50, is rotatably connected to a recessed portion 66A formed in the floor 66 via a pivot pin 52 member. As will be appreciated, the recessed portion 66A is positioned behind the seat. Further, the front leg 40 and the rear leg 46 are movably connected to each other via a coupling link 54. A front end portion of the coupling link 54 is rotatably connected to the front leg 40 via a hinge pin 56 at a position below the support shaft 42. Conversely, a rear end portion of the coupling link 54 is rotatably connected to the rear leg 46 via a hinge pin 57 at a position above the support shaft 48. The coupling link 54 thus arranged can rotate the front leg 40 about the support shaft 42 when the retracting link 50 is moved, which will be hereinafter described in detail.

The coupling link 54 is movably connected to the floor 66 via an auxiliary link 60. An upper end portion of the auxiliary link 60 is rotatably connected to a central portion of the coupling link 54 via a hinge pin 62. Conversely, a lower end portion of the auxiliary link 60 is rotatably connected to the recessed portion 66A of the floor 66 via a hinge pin 63. As a result, the seat cushion 10 (the cushion frame 12) is supported on the floor 66 by a special link mechanism, i.e., a parallel linkage that is composed of the retracting link 50 and the auxiliary link 60. Therefore, in comparison with a case in which the seat cushion 10 is supported on the floor 66 by a single linkage that is composed of the retracting link 50, the seat can be moved between a use condition and a retracted condition (a nonuse condition) along a highly stabilized trajectory.

As shown in FIG. 2, a lever 70 (an operating member) is disposed on a rear surface of the seat back 20. The lever 70 is rotatably attached to the back frame (not shown) via a fulcrum shaft 72. The lever 70 is arranged and constructed to be manually operated from behind of the seat back 20. Further, an arm member 74 is coupled to the shaft 72. The arm member 74 is arranged and constructed to rotate with the lever 70 about the shaft 72 when the lever 70 is rotated. Conversely, an arm member 26 is coupled to the connecting shaft 24 of the headrest 22. The arm member 26 is arranged and constructed to rotate with the headrest 22 about the connecting shaft 24.

The arm member 74 and the arm member 26 are connected to each other via a first cable 80. Further, one end of a second cable 81 is connected to the first cable 80 via a connector member C1. The other end of the second cable 81 is coupled to releasing members (not shown) of the locking devices (not shown) that connect the front and rear legs 40 and 46 to the anchors 68 and 69. That is, the arm member 74 and the releasing members of the locking devices are connected to each other via the second cable 81. Therefore, when the lever 70 is manually operated or rotated, the first cable 80 is pulled downwardly, so that the headrest 22 is inclined forwardly. At the same time, the second cable 81 is pulled upwardly, thereby unlocking the locking devices (not shown), so that the front and rear legs 40 and 46 are respectively released or unlocked from the anchors 68 and 69.

Next, an unlocking mechanism for unlocking the reclining mechanism 30 will be described.

Figure 3:
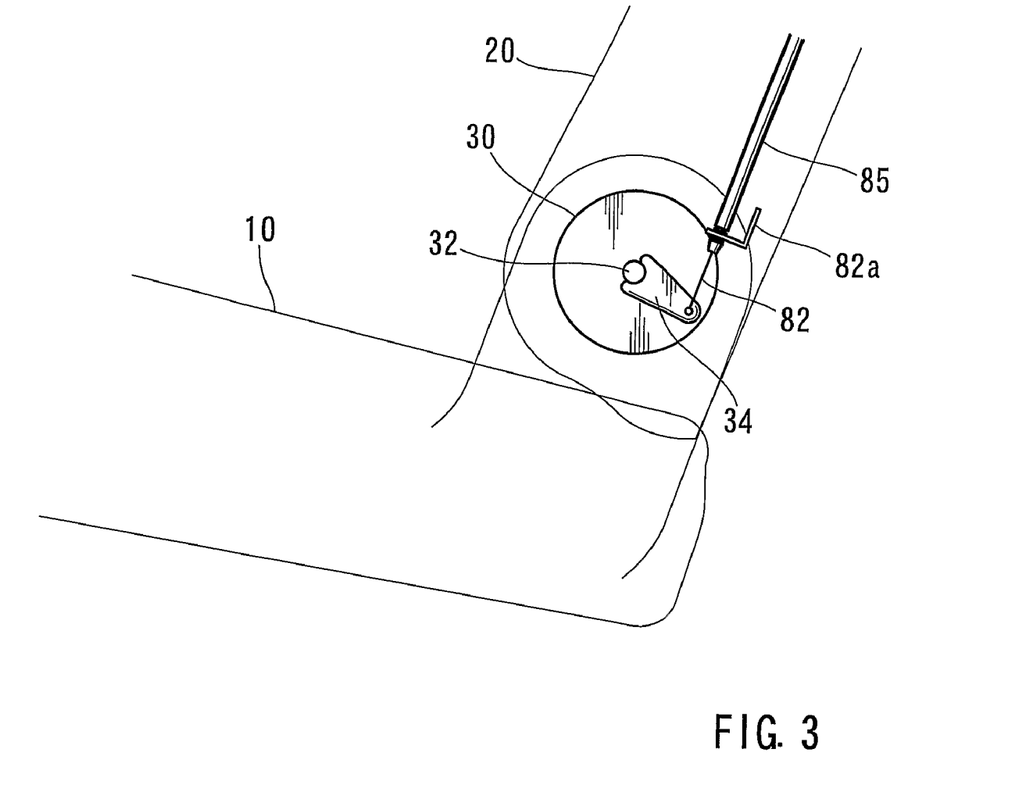
FIG. 3 is a side view of a reclining mechanism.
Figure 4:
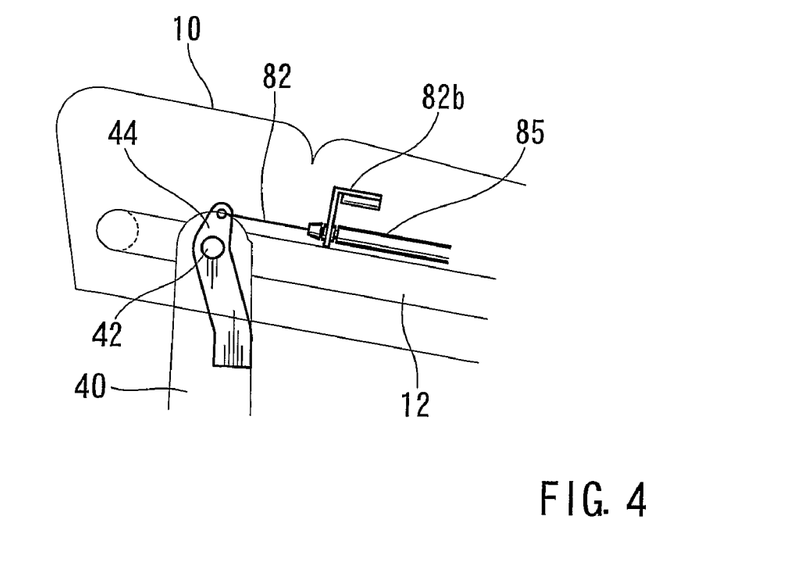
FIG. 4 is a partial side view of a seat cushion.

As shown in FIGS. 2 and 3, an arm member 34 is attached to a center shaft 32 of the reclining mechanism 30. The arm member 34 is arranged and constructed to rotate with the center shaft 32. Further, as shown in FIGS. 2 and 4, an arm member 44 is attached to an upper end portion of the front leg 40. The arm member 44 is arranged and constructed to rotate with the front leg 40 about the support shaft 42.

The arm member 34 and the arm member 44 are connected to each other via a third cable 82. As best shown in FIGS. 3 and 4, the third cable 82 is received in an outer tube 85 so as to move therein. As shown in FIG. 3, one end portion (a portion adjacent to the reclining mechanism 30) of the outer tube 85 is fixed to the back frame via a bracket 82a. Conversely, as shown in FIG. 4, the other end portion (a portion adjacent to the front leg 40) of the outer tube 85 is fixed to the cushion frame 12 via a bracket 82b.

Next, an operation for switching the seat from the use condition to the retracted condition will be described with reference to, in particular, FIGS. 5 to 8.

Figure 5:
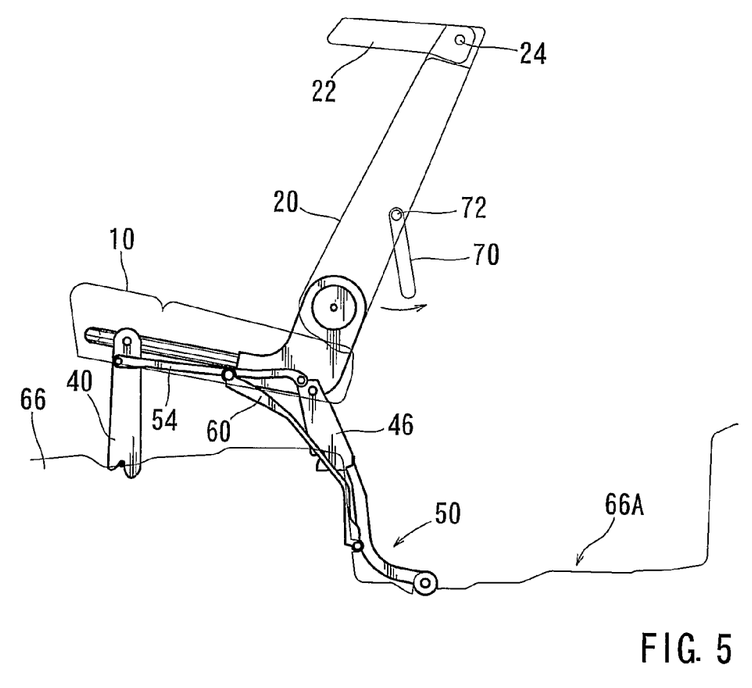
FIG. 5 is a side view of the retractable seat, which illustrates a first condition of the seat when the seat is moved from the use condition to a retracted condition.
Figure 6:
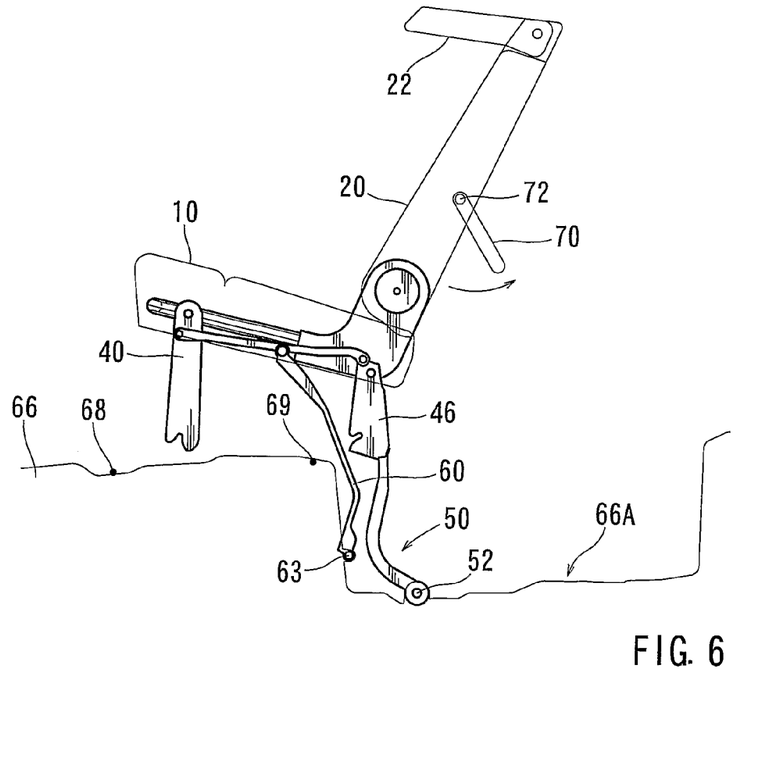
FIG. 6 is a side view of the retractable seat, which, illustrates a second condition of the seat when the seat is moved from the use condition to the retracted condition.

First, as shown in FIG. 5, the lever 70 is pulled or rotated rearwardly, so as to be rotated about an axial center of the shaft 72. As a result, the first cable 80 is pulled, so that the headrest 22 is inclined forwardly. When the lever 70 is further pulled or rotated rearwardly, the second cable 81 is pulled. As a result, as shown in FIG. 6, the locking devices (not shown) are unlocked, so that the front leg 40 and the rear leg 46 are respectively released from the anchors 68 and 69. Thus, the seat can be moved or inclined rearwardly while it is supported by the parallel linkage that is composed of the retracting link 50 and the auxiliary link 60.

Figure 7:
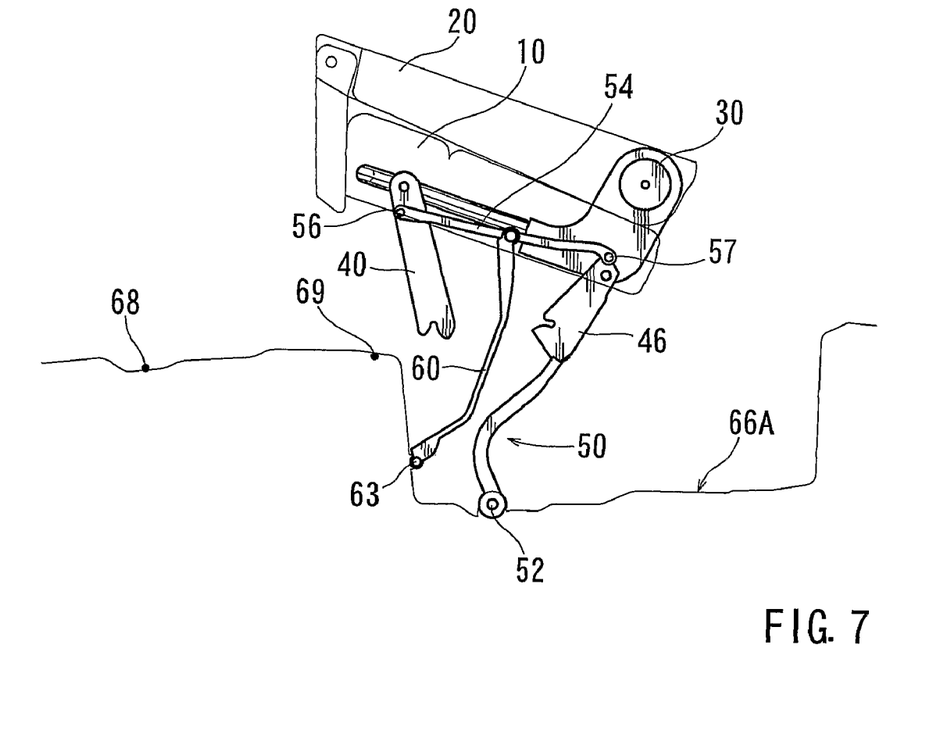
FIG. 7 is a side view of the retractable seat, which illustrates a third condition of the seat when the seat is moved from the use condition to the retracted condition.
Figure 8:
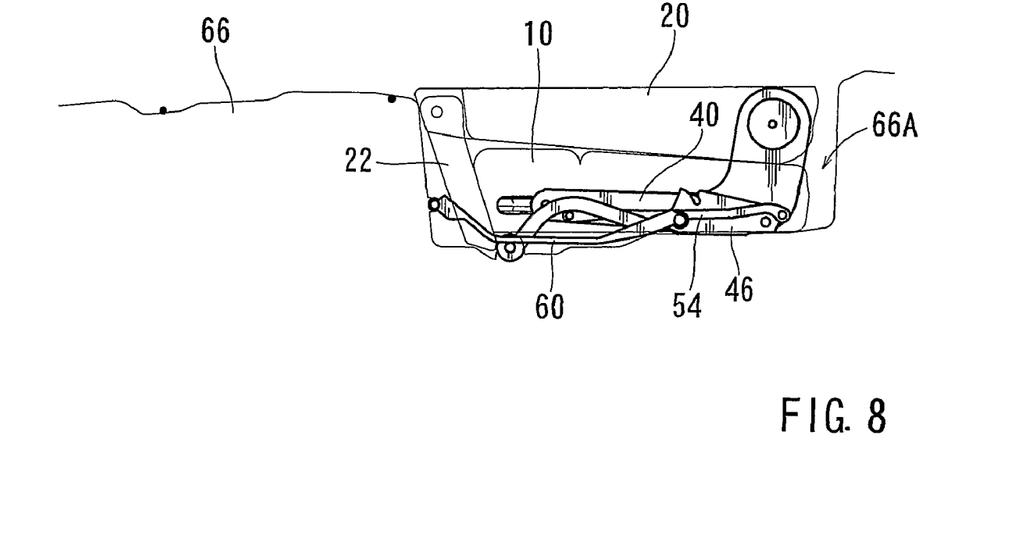
FIG. 8 is a side view of the retractable seat, which illustrates the retracted condition thereof.

When the seat is then moved to a condition shown by FIG. 7 depending on the motion of the parallel linkage (the retracting link 50 and the auxiliary link 60), the coupling link 54 is pulled rearwardly based on a displacement of the retracting link 50 (the rear leg 46), so that the front leg 40 rotates rearwardly about the support shaft 42. As a result, the arm member 44 is rotated about the support shaft 42, so that the third cable 82 is pulled forwardly. As a result, the arm member 34 is rotated, thereby rotating the center shaft 32 of the locking mechanism 30. Upon rotation of the center shaft 32, the reclining mechanism 30 is released or unlocked, so that the seat back 20 can be rotated forwardly. Thereafter, when a desired operational force is applied to the seat back 20 in order to rotate the seat back 20 forwardly, the seat back 20 is superimposed on the seat cushion 10, so that the seat is changed to a folded condition. At this time, the parallel linkage (the retracting link 50 and the auxiliary link 60) is gradually folded downwardly toward the recessed portion 66A of the floor 66 with the aid of a gravitational force while rotating the front leg 40 rearwardly. As a result, as shown in FIG. 8, the folded seat is retracted in the recessed portion 66A of the floor 66.

As described above, according to the present embodiment, the seat can be switched from the use condition to the retracted condition while the seat back 20 is rotated forwardly (i.e., while the seat is folded). Therefore, the seat can be directly retracted in the recessed portion 66A of the floor 66 by utilizing the operational force for rotating the seat back 20 and the gravitational force. In addition, the reclining mechanism 30 can be automatically released or unlocked when the seat is moved rearwardly. Therefore, it is not necessary to operate the lever 70 in order to release the reclining mechanism 30. That is, the lever 70 can simply be operated in order to incline the headrest 22 and to unlock the locking devices (not shown) that connect the front and rear legs 40 and 46 to the anchors 68 and 69. Therefore, a force required to operate the lever 70 can be reduced. Further, as previously described, the seat cushion 10 is supported on the floor 66 by the parallel linkage that is composed of the retracting link 50 and the auxiliary link 60. Therefore, the seat can be reliably moved from the use condition (FIG. 5) to the retracted condition (FIG. 8) along the highly stabilized trajectory.

Second Detailed Representative Embodiment

The second detailed representative embodiment will now described with reference to FIG. 9.

Because the second embodiment relates to the first embodiment, only the constructions and elements that are different from the first embodiment will be explained in detail. Elements that are the same in the first and second embodiments will be identified by the same reference numerals and a detailed description of such elements may be omitted.

Figure 9:
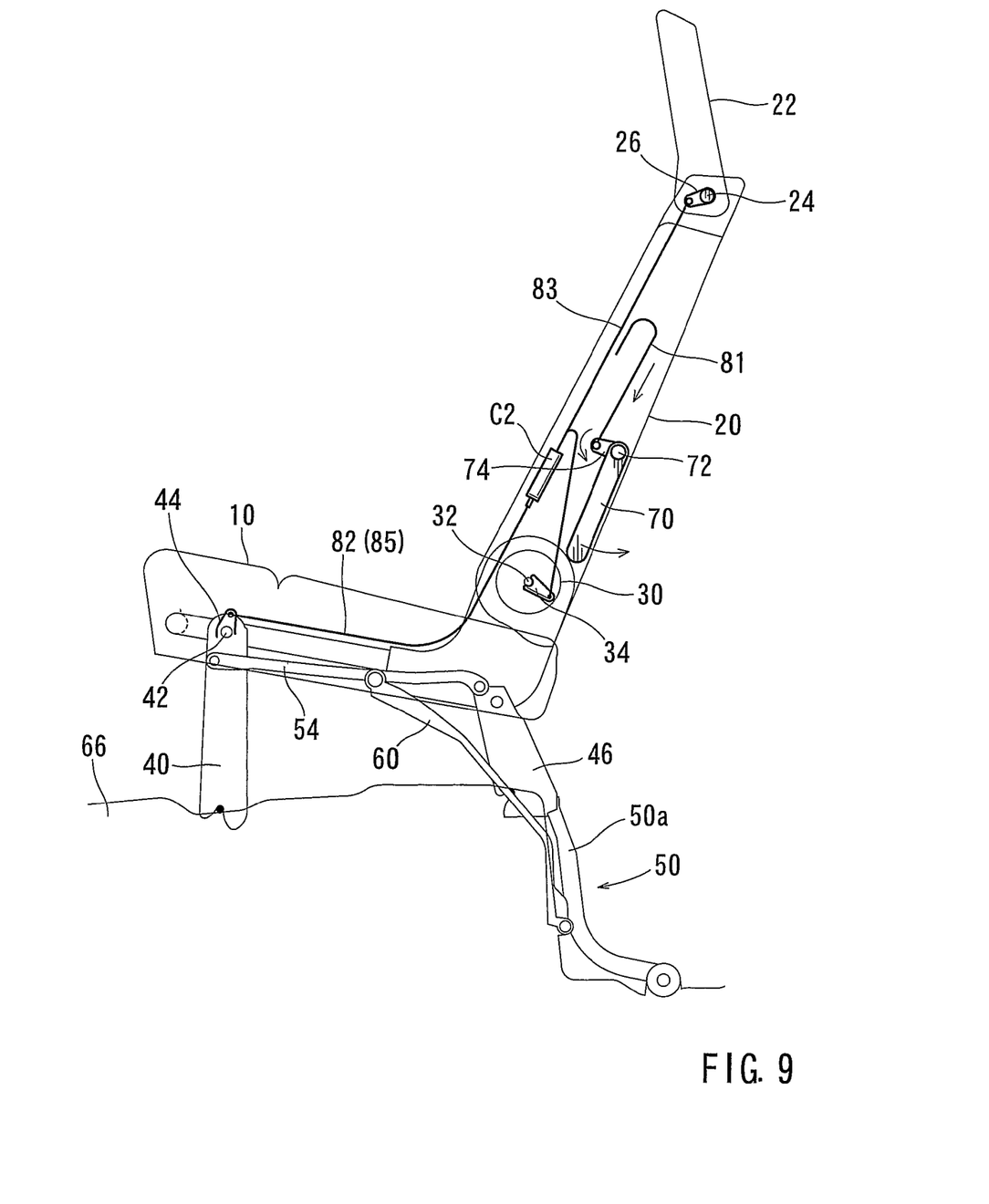
FIG. 9 is a view similar to FIG. 2, which illustrates a vehicle seat according to a second embodiment of the present invention.

As shown in FIG. 9, in the second embodiment, the first cable 80 of the first embodiment is omitted. In this embodiment, unlike the first embodiment, the arm member 74 and the releasing members of the locking devices are directly connected to each other via the second cable 81. Further, one end of a fourth cable 83 is connected to the third cable 82 via a connector member C2. The other end of the fourth cable 83 is connected to the arm member 26 of the headrest 22.

In the second embodiment, in order to switch the seat from the use condition to the retracted condition, similar to the first embodiment, when the lever 70 is pulled or rotated rearwardly, the second cable 81 is pulled. As a result, the locking devices (not shown) are unlocked, so that the front leg 40 and the rear leg 46 are respectively released from the anchors 68 and 69. Thereafter, when the seat is moved rearwardly, the front leg 40 rotates rearwardly about the support shaft 42. As a result, similar to the first embodiment, the third cable 82 is pulled, thereby rotating the center shaft 32 of the locking mechanism 30. At the same time, the fourth cable 83 is pulled, so that the headrest 22 is inclined forwardly. Thereafter, when the operational force is applied to the seat back 20 in order to rotate the seat back 20 forwardly, the seat can be retracted in the recessed portion 66A of the floor 66 while it is changed to the folded condition.

According to the second embodiment, the lever 70 can simply be operated in order to unlock the locking devices (not shown). That is, the headrest 22 can be automatically inclined forwardly when the seat is moved rearwardly. Therefore, the force required to operate the lever 70 can be further reduced.

Third Detailed Representative Embodiment

The third detailed representative embodiment will now described with reference to FIGS. 10-15.

Figure 10:
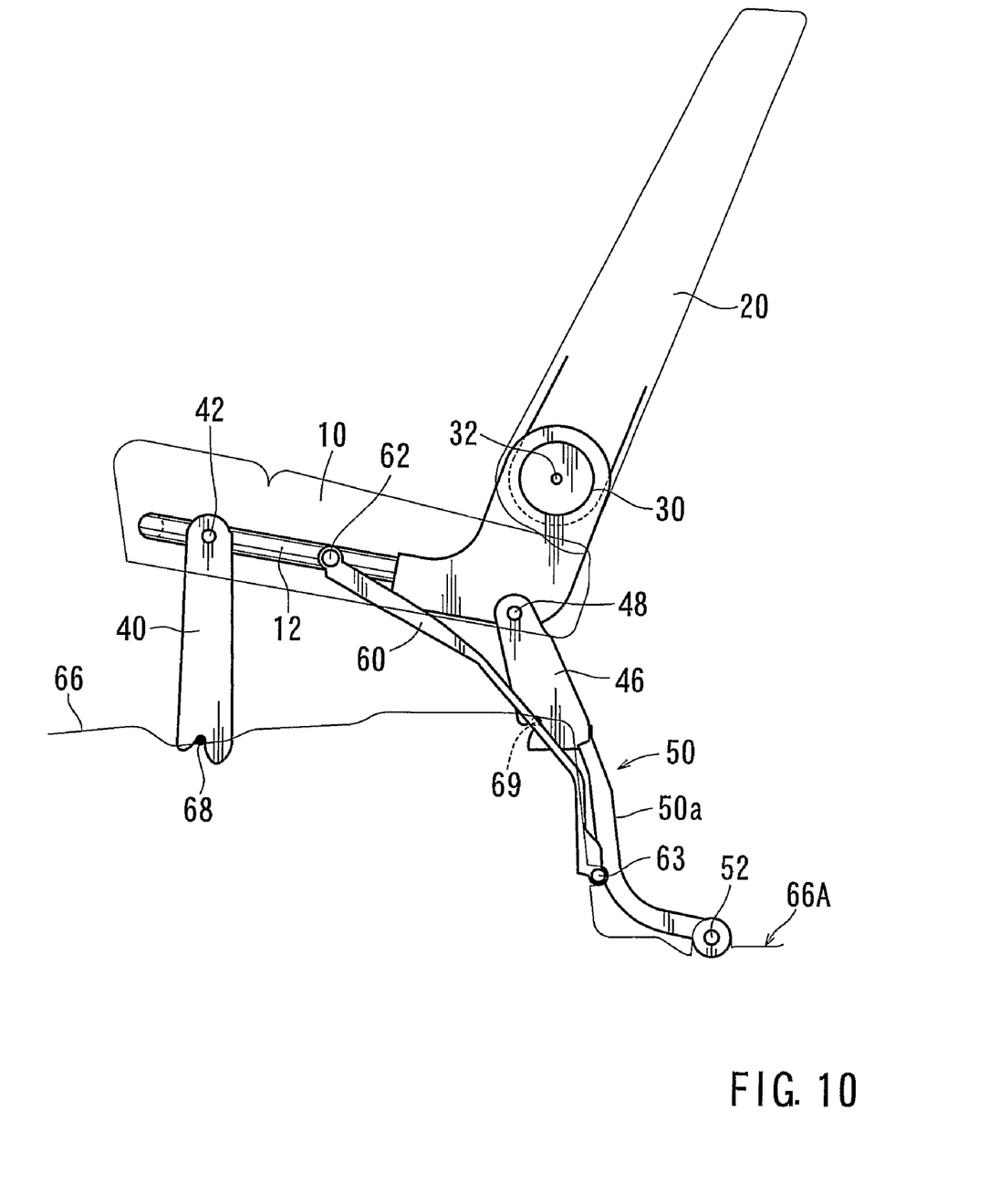
FIG. 10 is a side view of a vehicle seat according to a third embodiment of the present invention, which illustrates a use condition thereof.
Figure 11:
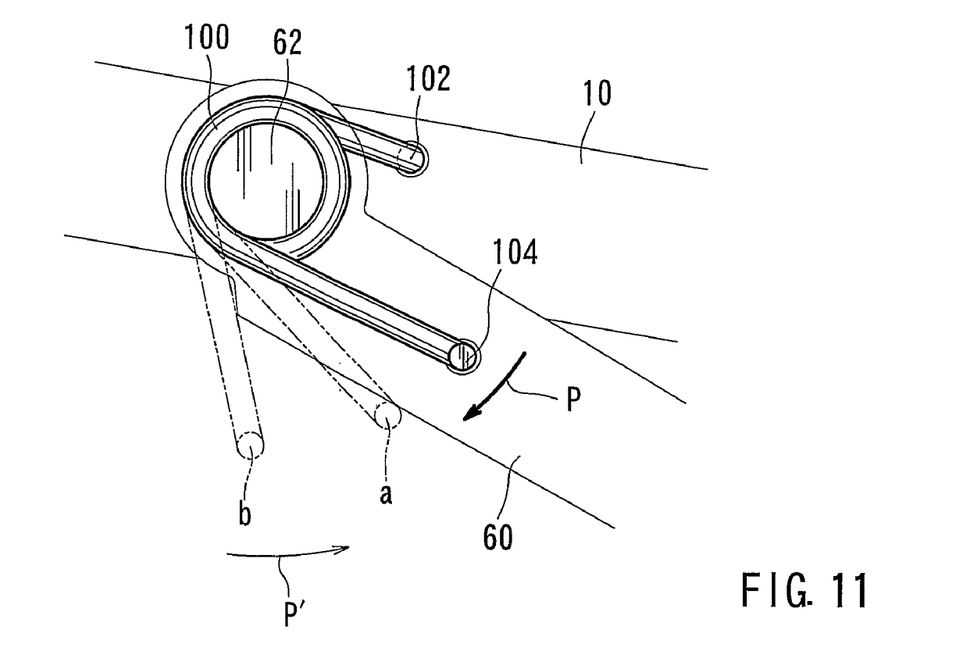
FIG. 11 is a partially enlarged view of FIG. 10.

A vehicle seat (a retractable seat) shown in FIGS. 10 and 11 may include a seat cushion 10 and a seat back 20. The seat cushion 10 is attached to a floor 66 via a pair of front legs 40 (one of which is shown for illustration purposes) and a pair of rear legs 46 (one of which is shown for illustration purposes). Further, the front legs 40 and associated members thereof may have the same structure. Therefore, a structure of one of the front legs 40 will be described hereinafter. Similarly, the rear legs 46 and associated members thereof may have the same structure. Therefore, a structure of one of the rear legs 46 will be described hereinafter.

The seat back 20 is rotatably connected to the seat cushion 10 via a pair of seat reclining mechanisms 30 (one of which is shown). Therefore, the seat back 20 can be tilted back and forth by operating the seat reclining mechanism 30 about a rotational shaft 32 thereof, so that a reclining angle thereof can be controlled. In addition, the seat back 20 can be rotated forwardly by unlocking the reclining mechanism 30, so as to be superimposed on the seat cushion 10.

The reclining mechanism 30 is connected to a cushion frame 12 of the seat cushion 10 and a back frame (not shown) of the seat back 20. Further, upper end portions of the front and rear legs 40 and 46 are respectively rotatably connected to the cushion frame 12 via support shaft 42 and 48. Conversely, lower end portions of the front and rear legs 40 and 46 are respectively removably connected or locked to anchors 68 and 69 disposed on the floor 66 via connecting or locking devices (not shown).

The rear leg 46 has an elongated member 50a that is fixedly connected to a lower end thereof. The rear leg 46 and the elongated member 50a may constitute a retracting link 50. A distal end of the elongated member 50, i.e., a lower end of the retracting link 50, is rotatably connected to a recessed portion 66A formed in the floor 66 via a pivot pin 52 member. As will be appreciated, the recessed portion 66A is positioned behind the seat.

The cushion frame 12 is movably connected to the floor 66 via an auxiliary link 60. An upper end portion of the auxiliary link 60 is rotatably connected to a central portion of the cushion frame 12 via a hinge pin 62. Conversely, a lower end portion of the auxiliary link 60 is rotatably connected to the recessed portion 66A of the floor 66 via a hinge pin 63. As a result, the seat cushion 10 (the cushion frame 12) is supported on the floor 66 by a special link mechanism, i.e., a four-link parallel linkage that is composed of the retracting link 50 and the auxiliary link 60.

Figure 12:
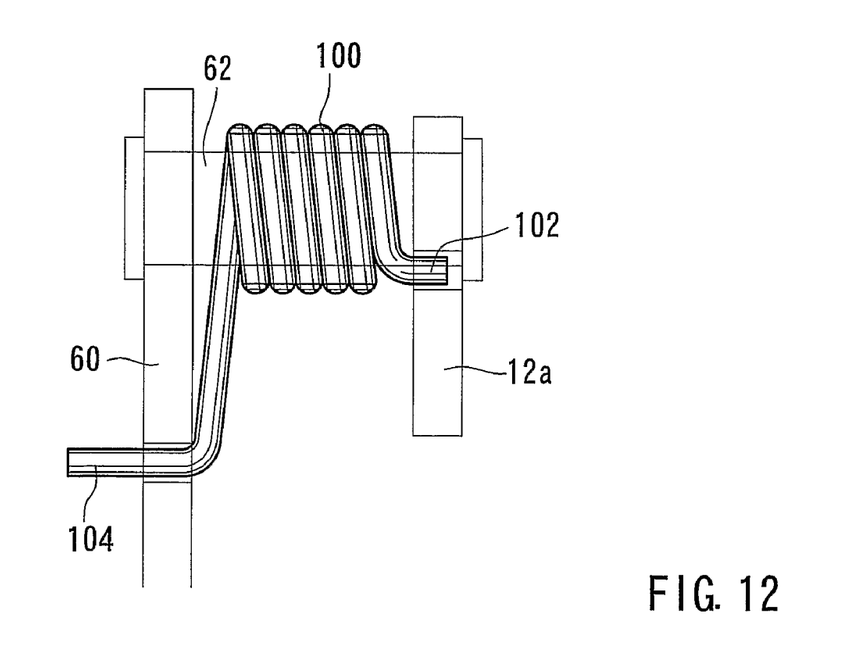
FIG. 12 is a rear view of FIG. 11.

As shown in FIGS. 11 and 12, in this link mechanism, a torsion spring 100 (a coil spring) is attached to the hinge pin 62 of the auxiliary link 60. One end portion 102 of the torsion spring 100 engages a hole formed in the cushion frame 12. Conversely, the other end portion 104 of the torsion spring 100 engages a hole formed in the auxiliary link 60.

The torsion spring 100 is arranged and constructed to have different rotational biasing forces depending on rotational angles of the auxiliary link 60 relative to the cushion frame 12. That is, when the end portion 104 of the torsion spring 100 is in a position shown by a solid line in FIG. 11 (which position corresponds to, for example, an initial condition shown in FIG. 13), the torsion spring 100 may have a biasing force (a normal biasing force) that is directed to a rotational direction (a normal rotational direction) shown by an arrow P in FIG. 11. When the auxiliary link 60 is rotated relative to the cushion frame 12 until the end portion 104 of the torsion spring 100 reaches a position a shown by a broken line in FIG. 11 (which position substantially corresponds to the condition shown in FIG. 14), the torsion spring 100 may have a biasing force that is substantially zero. Further, when the auxiliary link 60 is further rotated relative to the cushion frame 12 until the end portion 104 of the torsion spring 100 reaches a position b shown by a broken line in FIG. 11 (which position corresponds to a final condition (not shown) between the condition shown in FIG. 14 and the condition shown in FIG. 15), the torsion spring 100 may have a biasing force (a reverse biasing force) that is directed to a rotational direction (a reverse rotational direction) shown by an arrow P' in FIG. 11.

Next, an operation for switching the seat from the use condition to a retracted condition will be described with reference to, in particular, FIGS. 13 to 15.

Figure 13:
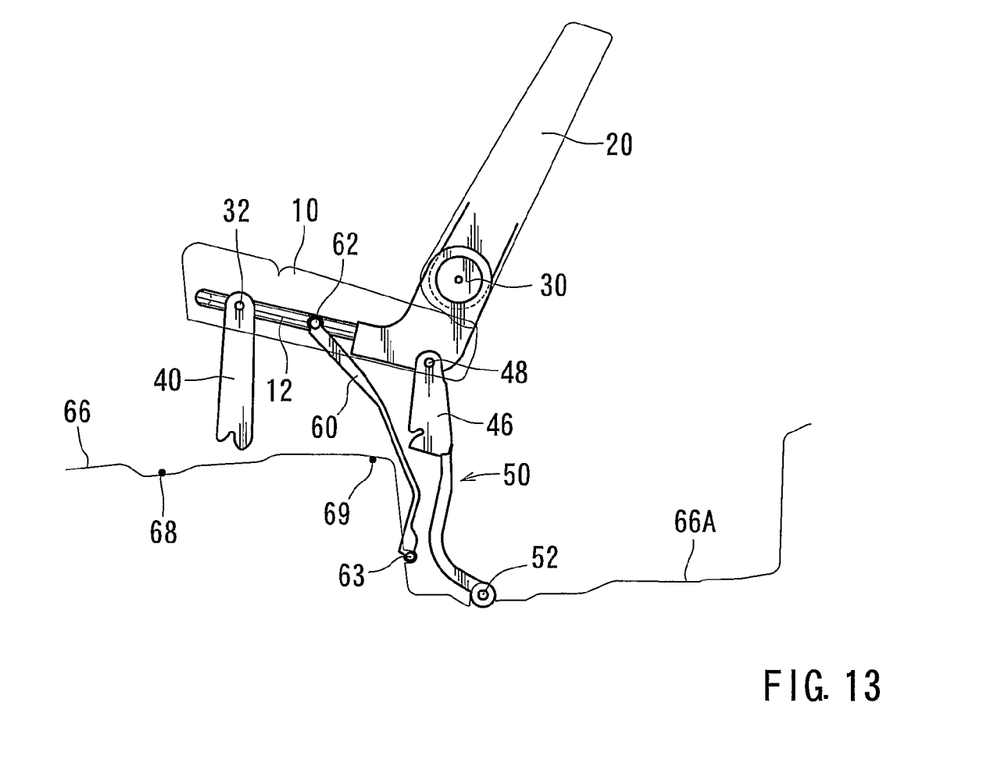
FIG. 13 is a side view of the retractable seat, which illustrates an initial condition of the seat when the seat is moved from the use condition to a retracted condition.
Figure 14:
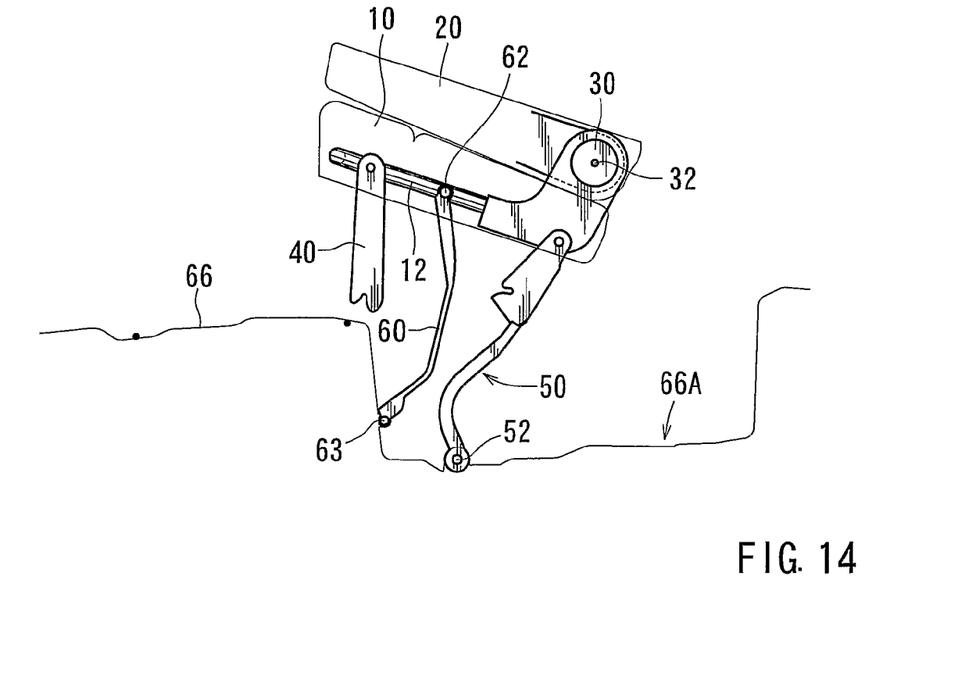
FIG. 14 is a side view of the retractable seat, which illustrates a middle condition of the seat when the seat is moved from the use condition to the retracted condition.

First, as shown in FIG. 13, a lever (not shown) is pulled or rotated rearwardly, so that the front leg 40 and the rear leg 46 are respectively released from the anchors 68 and 69. Thus, the seat can be moved or inclined rearwardly depending on the rotational motion of the parallel linkage that is composed of the retracting link 50 and the auxiliary link 60.

Thereafter, the reclining mechanism 30 is released or unlocked. Subsequently, a desired operational force is applied to the seat back 20 in order to rotate the seat back 20 forwardly. As a result, the seat is changed to a folded condition (FIG. 14). At the same time, the parallel linkage (the retracting link 50 and the auxiliary link 60) is gradually folded downwardly toward the recessed portion 66A of the floor 66 by the applied operational force with the aid of a gravitational force. As will be recognized, at this time, the auxiliary link 60 may rotate relative to the cushion frame 12. As a result, as shown in FIG. 15, the folded seat is retracted in the recessed portion 66A of the floor 66.

Further, as previously described, the seat cushion 10 (the cushion frame 12) is supported by the parallel linkage that is composed of the retracting link 50 and the auxiliary link 60. Therefore, the seat can be reliably moved from the use condition (FIG. 10) to the retracted condition (FIG. 15) along a highly stabilized trajectory.

As described above, the torsion spring 100 attached to the hinge pin 62 is arranged and constructed to generate the different rotational biasing forces depending on the rotational angles of the auxiliary link 60 relative to the cushion frame 12. That is, when the seat is in the use condition shown in FIG. 10 (or the initial condition shown in FIG. 13), the torsion spring 100 may have the biasing force (the normal biasing force) that is directed to the rotational direction shown by the arrow P in FIG. 11. Conversely, the seat is moved to the final condition (not shown) between the condition shown in FIG. 14 and the condition shown in FIG. 15, the torsion spring 100 may have the biasing force (the reverse biasing force) that is directed to the rotational direction shown by the arrow P' in FIG. 11. Therefore, when the seat is in the initial condition shown in FIG. 13, the biasing force (the normal biasing force) may function as an assisting force that can assist the downward movement (the folding motion) of the parallel linkage (the retracting link 50 and the auxiliary link 60). Conversely, when the seat reaches the final condition between the condition shown in FIG. 14 and the condition shown in FIG. 15, the biasing force (the reverse biasing force) may function as a resisting force against the downward movement (the folding motion) of the parallel linkage. In other words, such a biasing force may function as a damping force on the seat. Therefore, the seat can be slowly retracted in the recessed portion 66A of the floor 66.

Figure 15:
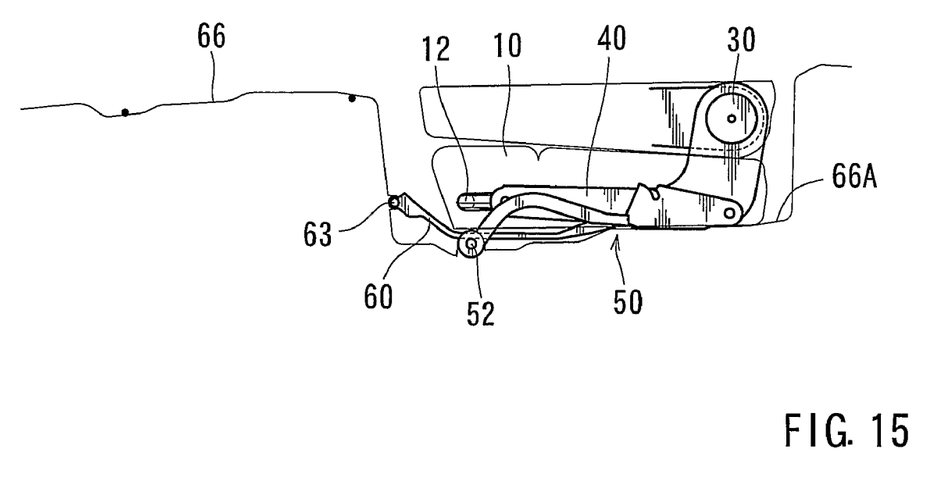
FIG. 15 is a side view of the retractable seat, which illustrates the retracted condition thereof.

Further, in order to switch the seat from the retracted condition shown in FIG. 15 to the use condition shown in FIG. 10, the seat is reversely operated. As will be appreciated, in the reverse operation of the seat, the reverse biasing force may function as an assisting force that can assist the upward movement (the unfolding motion) of the parallel linkage. Conversely, the normal biasing force may function as a resisting force against the upward movement (the unfolding motion) of the parallel linkage. In other words, such a biasing force may function as a damping force on the seat. Therefore, the seat can be slowly or smoothly returned to the use condition.

As described above, according to the third embodiment, the torsion spring 100 can generate the different rotational biasing forces (the assisting force and the resisting force) depending on the rotational angles of the auxiliary link 60 relative to the cushion frame 12. That is, the torsion spring 100 may have two different biasing functions. Therefore, it is not necessary to provide an additional spring. This may lead to reduced manufacturing cost.

Naturally, various changes and modifications may be made to the present invention without departing from the scope of the invention. For example, in the third embodiment, although the torsion spring 100 is attached to the hinge pin 62, the torsion spring 100 can be attached to the support shaft 48 of the rear leg 46. In addition, the torsion spring 100 can be attached to the rotational shaft 32 of the reclining mechanism 30 such that different rotational biasing forces (an assisting force and an resisting force) depending on the rotational angles of the back frame relative to the cushion frame 12. In such a case, the seat back 20 can be easily rotated forwardly. In addition, the seat back 20 can be slowly superimposed on the seat cushion 10.

Further, in the first and second embodiments, a torsion spring corresponding to the torsion spring 100 is not used. However, such a torsion spring can be attached to the hinge pin 62 of the auxiliary link 60 in the first and second embodiments. In such a case, the torsion spring may have the same function as the torsion spring 100 in the third embodiment.

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A vehicle seat, comprising:
a seat cushion;
a seat back rotatably connected to the seat cushion via a reclining mechanism;
front and rear legs removably connecting the seat cushion to a vehicle floor;
a retracting link;
an operating member capable of removing the front and rear legs from the floor; and
a coupling link, and
an unlocking mechanism,
wherein the seat back can be rotated forwardly by unlocking the reclining mechanism, so as to be superimposed on the seat cushion,
wherein when the front and rear legs are removed from the floor, the seat can be moved from a use condition to a retracted condition depending on the motion of the retracting link,
wherein the coupling link is configured to rotate the front leg based on a displacement of the retracting link when the seat is moved from the use condition to the retracted condition, and
wherein the unlocking mechanism is configured to unlock the reclining mechanism as a result of the front leg being rotated.

2. The vehicle seat as defined in claim 1, wherein upper end portions of the front and rear legs are respectively rotatably connected to a cushion frame of the seat cushion,
wherein the retracting link is composed of the rear leg and an elongated member extending from a lower end thereof, the elongated member being rotatably connected to the floor, and
wherein the coupling link movably connects the front and rear legs and is movably connected to the floor via an auxiliary link at a central portion thereof.

* * * * *